(12) United States Patent
Shimizu et al.

(10) Patent No.: US 6,902,511 B2
(45) Date of Patent: Jun. 7, 2005

(54) VEHICLE DRIVING FORCE CONTROL APPARATUS

(75) Inventors: Kouichi Shimizu, Sagamihara (JP); Hiroyuki Ohya, Zama (JP)

(73) Assignee: Nissan Motor, Co., Ltd., Kanagawa (JP)

( * ) Notice: Subject to any disclaimer, the term of this patent is extended or adjusted under 35 U.S.C. 154(b) by 0 days.

(21) Appl. No.: 10/635,442

(22) Filed: Aug. 7, 2003

(65) Prior Publication Data

US 2004/0040775 A1 Mar. 4, 2004

(30) Foreign Application Priority Data

Aug. 27, 2002 (JP) ........................................ 2002-247552

(51) Int. Cl.⁷ .............................................. B60K 41/02
(52) U.S. Cl. .................... 477/4; 477/3; 477/5; 477/170; 477/171; 477/172; 477/174; 477/175; 180/65.2; 180/65.3
(58) Field of Search ................................ 477/170, 171, 477/172, 174, 175, 3, 4, 5; 180/65.2, 65.3, 65.4

(56) References Cited

U.S. PATENT DOCUMENTS

| | | | | |
|---|---|---|---|---|
| 6,059,064 | A | * | 5/2000 | Nagano et al. ............. 180/243 |
| 6,205,379 | B1 | * | 3/2001 | Morisawa et al. ............ 701/22 |
| 6,434,469 | B1 | | 8/2002 | Shimizu et al. |
| 6,442,454 | B1 | | 8/2002 | Akiba et al. |
| 6,569,055 | B2 | * | 5/2003 | Urasawa et al. ............... 477/5 |
| 6,638,195 | B2 | * | 10/2003 | Williams ........................ 477/5 |
| 2003/0010559 | A1 | | 1/2003 | Suzuki |
| 2003/0064858 | A1 | | 4/2003 | Saeki et al. |
| 2003/0089539 | A1 | | 5/2003 | Kadota |
| 2003/0151381 | A1 | | 8/2003 | Kadota et al. |
| 2004/0050599 | A1 | * | 3/2004 | Krzesicki et al. .......... 180/65.3 |

FOREIGN PATENT DOCUMENTS

| | | | |
|---|---|---|---|
| DE | 199 03 148 A | 4/2000 | |
| DE | 100 31 312 A | 1/2002 | |
| EP | 1327547 A2 * | 7/2003 | ............ B60K/6/04 |
| JP | 06-319206 A | 11/1994 | |
| JP | 11-243608 A | 9/1999 | |
| JP | 2000-217201 A | 8/2000 | |
| JP | 2001-138764 A | 5/2001 | |
| JP | 2002-218605 A | 8/2002 | |
| JP | 2003-025861 A | 1/2003 | |
| JP | 2003-130200 A | 5/2003 | |
| JP | 2003-156079 A | 5/2003 | |
| JP | 2003-209902 A | 7/2003 | |
| WO | WO02-08012 A1 | 1/2002 | |

* cited by examiner

*Primary Examiner*—Richard M. Lorence
*Assistant Examiner*—David D. Le
(74) *Attorney, Agent, or Firm*—Shinjyu Global IP Counselors, LLP

(57) ABSTRACT

A vehicle driving force control apparatus is provided for a vehicle to prevent a shock from being generated when a clutch disposed between a subordinate drive source and subordinate drive wheels is transferred to a disengaged state during vehicle travel. When a transition is made from a four-wheel drive state to a two-wheel drive state, and a clutch is released during vehicle travel, the motor torque is maintained constant at a level of a clutch-release torque required by the electric motor as the output for bringing the torque on the clutch substantially to zero.

18 Claims, 9 Drawing Sheets

VEHICLE DRIVING FORCE CONTROL APPARATUS

BACKGROUND OF THE INVENTION

1. Field of the Invention

The present invention generally relates to a vehicle driving force control apparatus for a vehicle in which a pair of drive wheels are driven by a drive torque from an electric motor. Preferably, the electric motor is driven with electric power generated by a generator that is driven by an internal combustion engine. The present invention especially useful in an all wheel drive vehicle in which a pair of main drive wheels are driven by a main drive source, such as internal combustion engine, and a pair of subordinate drive wheels are driven by the electric motor. Thus, the invention is particularly well-suited for a so-called battery-less four-wheel drive vehicle in which the engine drives the generator and the electric power from the generator is supplied to the electric motor.

2. Background Information

In conventional practice, a driving force control apparatus for a vehicle in which the front wheels are driven by an internal combustion engine, the rear wheels can be driven by an electric motor, and a clutch or reduction gear is disposed in the torque transfer path from the electric motor to the rear wheel axle is described, for example, in Japanese Laid-Open Patent Publication No. 11-243608.

In the driving force control apparatus described in Japanese Laid-Open Patent Publication No. 11-243608, the generation of shocks during clutch connection is prevented by connecting the clutch after idling the electric motor such that the rotational speed of the electric motor becomes equal to a speed that corresponds to the rotational speed of the axle shaft when a transition to a four-wheel drive state is made during vehicle travel.

SUMMARY OF THE INVENTION

It has been discovered that in the aforementioned prior art, a differential between the rotational speeds of the clutch on the output shaft side and the input shaft side is regarded as the cause of shocks generated during clutch operation. In terms of the underlying technical idea, it is commonly believed that there is apparently no differential in the rotational speed between the output shaft side and the input shaft side when the clutch is moved to a disengaged state, so there is no need to perform any processing to match the rotational speeds, and no shock is generated.

However, the inventors have confirmed that shocks are sometimes generated when the clutch is disengaged. Specifically, in a system in which the drive sources for driving the main drive wheels and the subordinate drive wheels are constructed separately from each other and the subordinate drive wheels are driven only when necessary, the torque from the subordinate drive wheels acts on the clutch because the vehicle is in motion when the clutch is changed to a disengaged state after the output of the electric motor becomes zero as a transfer is made from a four-wheel drive state to a two-wheel drive state during vehicle travel. A resulting drawback is that although there is no differential in rotational speed between the input and output shafts of the clutch, a shock is still sometimes generated because of the existence of a torque that is at or above a prescribed level in the clutch position.

For this reason, a shock is still sometimes generated by the action of a torque that is at or above a prescribed level in the clutch position because this torque exerts an action despite the fact that there is no differential in rotational speed between the input and output shafts of the clutch.

The present invention focuses on this kind of problem and aims to provide a driving force control apparatus for a vehicle capable of preventing a shock from being generated when the clutch disposed between the subordinate drive source and subordinate drive wheels is moved to a disengaged state during vehicle travel.

In view of the foregoing, a vehicle driving force control apparatus is provided for a vehicle having a first drive wheel, a first drive source configured to drive the first drive wheel, and a clutch disposed in a torque transfer path from the first drive source to the first drive wheel. The vehicle driving force control apparatus basically comprises a drive mode selection section, a clutch release section, a brake force command determining section, and a clutch maintaining section. The drive mode selection section is configured to select a first drive mode in which the clutch is engaged and a second drive mode in which the clutch is disengaged. The clutch release section is configured to output a clutch release command to disengage the clutch when the first drive mode is selected by the drive mode selection section. The brake force command-determining section is configured to determine a braking state. The clutch maintaining section is configured to maintain a current state of the clutch when the brake force command determining section determines the braking state.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
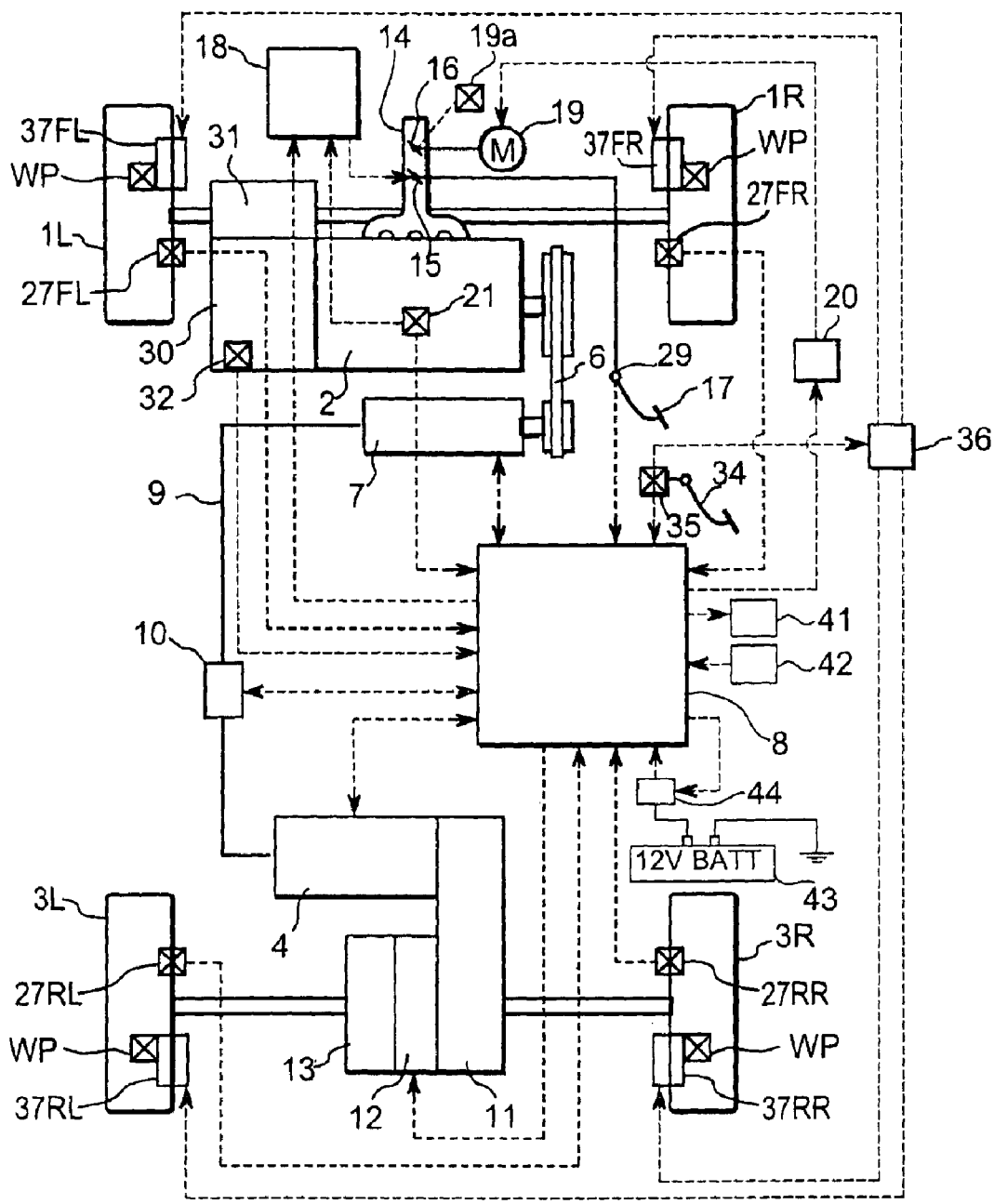
FIG. 1 is a schematic block diagram of a vehicle equipped with a vehicle driving force control apparatus in accordance with preferred embodiments of the present invention.
Figure 2:
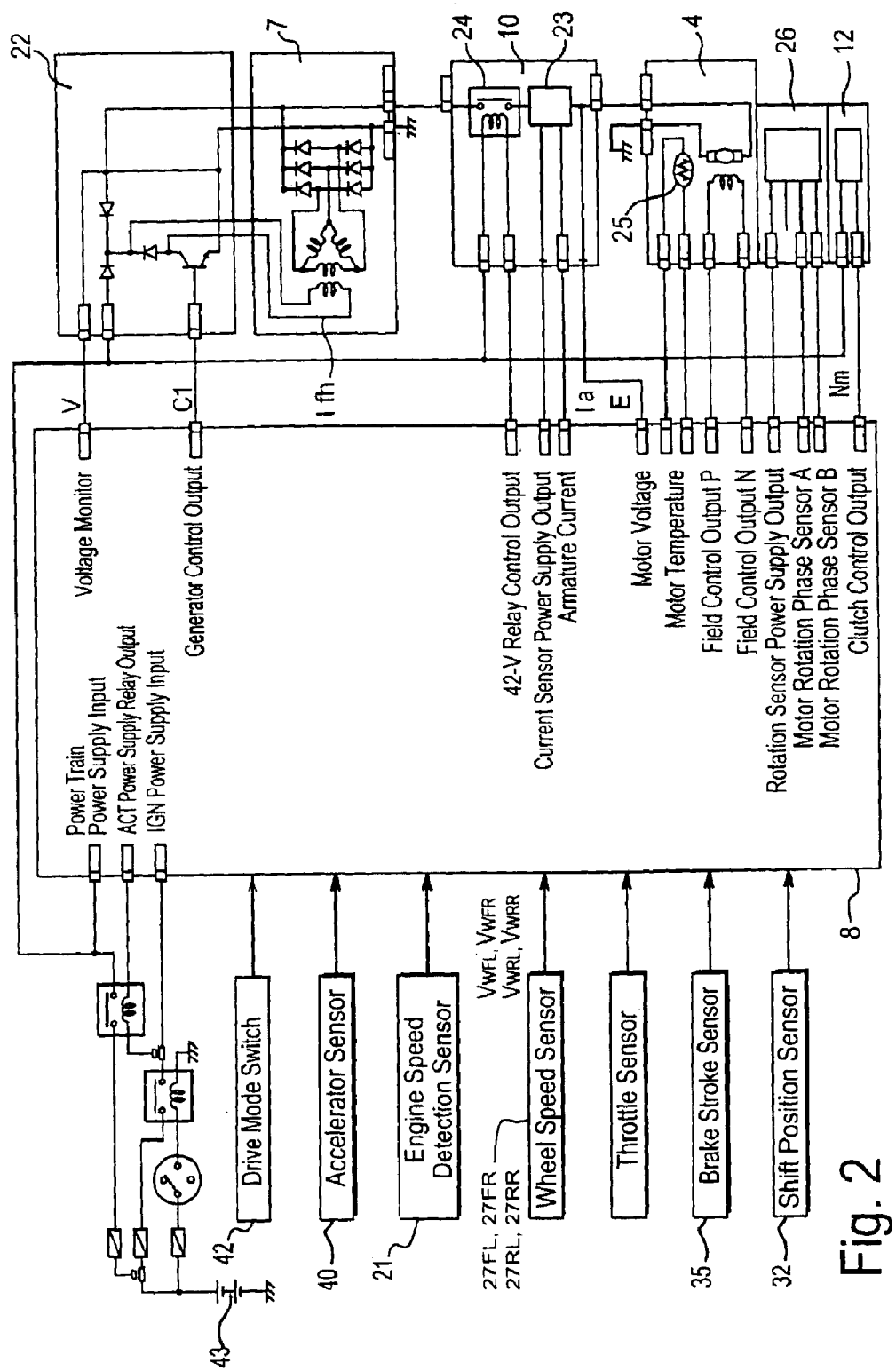
FIG. 2 is a block diagram showing a control system configuration for the vehicle driving force control apparatus illustrated in FIG. 1 in accordance with the illustrated embodiments of the present invention.

Referring initially to FIGS. 1 and 2, a vehicle driving force control apparatus will now be explained in accordance with a first embodiment of the present invention. As seen in FIG. 1, a four wheel drive vehicle is diagrammatically illustrated that is equipped with the vehicle driving force control apparatus in accordance with the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4, which is preferably a direct current (DC) electric motor. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh of the generator 7 is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13 in a conventional manner.

According to the present invention, the shock generated when the clutch 12 is brought to a disengaged state can be avoided by disengaging the clutch 12 when the torque on the clutch 12 is at zero level or in a low state, as explained below. In addition, the clutch 12 can be released in a controlled state in which the motor 4 torque remains constant at a clutch-release torque, whereby the clutch 12 can be released when the motor torque remains at the level of the clutch-release torque in a stable fashion. Braking causes a disturbance to a motor torque to which the electricity of the generator 7 is supplied, and thus, makes it difficult to release the clutch 12 when a condition for releasing the clutch 12 is met. However, according to the present invention, the clutch 12 is released when there is no braking or when an amount of the braking is small. Therefore, in the present invention, the clutch 12 can be released when targeted clutch releasing condition is met without being affected by braking.

The clutch 12 is preferably an electromagnetic clutch having an input shaft 12a coupled to the electric motor 4 via the reduction gear 11, and an output shaft 12b coupled to the rear wheels 3L and 3R via the differential gear 13. Preferably, the clutch 12 is turned on to perform an engagement operation in which the input and output shafts 12a and 12b are connected such that the drive torque from the electric motor 4 is transmitted to the rear wheels 3L and 3R. When the clutch 12 is turned off, a disengagement or release operation occurs in which the input and output shafts 12a and 12b are disengaged such that the drive torque from the electric motor 4 is no longer transmitted to the rear wheels 3L and 3R. Thus, when the clutch 12 is engaged, the vehicle is in a four-wheel (multi-wheel) drive state in which all of the wheels 1L, 1R, 3L and 3R are driven. When the clutch 12 is released, the vehicle is in a two-wheel (non-all wheel) drive state in which only the front wheels 1L and 1R are driven by the internal combustion engine 2. It is preferable in accordance with the present invention to release the clutch 12, during the vehicle traveling, such that substantially no shock occurs in the vehicle, or at least the shock to the vehicle is below a prescribed limit. Preferably, the clutch 12 is released in accordance with the present invention when the vehicle is traveling such that the drive torque of the electric motor 4 is sufficient to avoid a vehicle shock above a prescribed limit.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position detecting device or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 29 that detects the depression amount of the accelerator pedal 17 or the degree of opening of the main throttle valve 15. The depression amount detection value from the accelerator sensor 29 is outputted as a control signal to the 4WD controller 8. The accelerator sensor 29 constitutes an acceleration or throttle instruction sensor. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor 19a shown in FIG. 2. The step count of the stepper motor 19 is feedback-controlled based on the throttle opening detection value detected by this throttle sensor 19a. The output torque of the internal combustion engine 2 can be controlled (reduced) independently of the driver's operation of the accelerator pedal 17 by adjusting the throttle opening of the sub throttle valve 16 so as to be smaller than the throttle opening of the main throttle valve 15.

The apparatus is also equipped with an engine rotational speed sensor 21 that detects the rotational speed Ne of the internal combustion engine 2. The engine rotational speed sensor 21 outputs a control signal that is indicative of the engine rotational speed Ne to both the engine controller 18 and the 4WD controller 8.

As shown in the FIG. 1, the engine output torque Te of the internal combustion engine 2 is transferred to the left and right front wheels 1L and 1R through an automatic transmission 30 using a torque converter and a differential gear 31 in a conventional manner. A portion of the engine output torque Te of the internal combustion engine 2 is transferred to the generator 7 using the endless drive belt 6 to supply electrical energy to the electric motor 4. In other words, the generator 7 is rotated at a rotational speed Nh, which is obtained by multiplying the rotational speed Ne of the internal combustion engine 2 by the pulley ratio of the endless drive belt 6.

The transmission 30 is provided with a shift position detecting device or sensor 32 (gear ratio detecting device) that is configured and arranged to detect the current gear range of the automatic transmission 30. The shift position detecting sensor 32 is configured and arranged to output or send a detected shift position signal that is indicative of the current gear range of the transmission 30 to the 4WD controller 8.

A brake pedal 34 is provided that constitutes a brake instructing/operating section. The stroke amount of the brake pedal 34 is detected by a brake stroke sensor 35, which constitutes a brake operation amount sensor. The brake stroke sensor 35 can be either a sensor that measures the actual stroke amount of the brake pedal 34 or a master cylinder pressure sensor that senses master cylinder pressure which is indicative of the stroke amount of the brake pedal 34. In either case, the brake stroke sensor 35 outputs the brake stroke amount it detects to a brake controller 36 and the 4WD controller 8. The brake stroke sensor 35 can also be configured and arranged to include a brake switch that indicates that the brake pedal 34 has been depressed by a prescribed amount or not. Thus, a brake on signal is sent to the 4WD controller 8 which is indicative of the brake pedal 34 having been depressed by the prescribed amount.

The brake controller 36 controls the braking force acting on the vehicle by controlling the braking devices (e.g., disc brakes) 37FL, 37FR, 37RL and 37RR installed on the wheels 1L, 1R, 3L and 3R in response to the inputted brake stroke amount by the brake pedal 34. Each of the braking devices 37FL, 37FR, 37RL and 37RR includes a wheel cylinder pressure sensor WP that is operatively connected to the 4WD controller 8. The wheel cylinder pressure sensors WP are configured and arranged to output a signal indicative of the wheel cylinder pressures of the braking devices 37FL, 37FR, 37RL and 37RR to the 4WD controller 8 via the braking controller 36.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value C1 (duty ratio or field current value). The voltage adjuster 22 receives the generator control command value C1 (duty ratio or field current value) from the 4WD controller 8 and adjusts the field current Ifh of the generator 7 to a value corresponding to the generator control command value C1. The voltage adjuster 22 is also configured and arranged to detect the output voltage V of the generator 7 and then output the detected voltage value to the 4WD controller 8. Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs a detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a control command from the 4WD controller 8.

A control command from the 4WD controller 8 controls the field current Ifm of the electric motor 4. Thus, the adjustment of the field current Ifm by the 4WD controller 8 adjusts the drive torque Tm of the electric motor 4. A thermistor 25 measures the temperature of the electric motor 4 and produces a control signal indicative of the temperature of the electric motor 4 that is outputted to the 4WD controller 8.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor of the clutch 12.

The clutch 12 is preferably an electromagnetic clutch that connects and disconnects in response to a clutch control command issued from the 4WD controller 8. Of course, a hydraulic clutch can be used for clutch 12 is certain situations to carry out the present invention. Thus, the clutch 12 transmits torque from the electric motor 4 to the rear wheels 3L and 3R at a torque transfer rate corresponding to the clutch control command from the 4WD controller 8.

A warning lamp 41 for clutch connection is arranged inside the passenger compartment. The warning lamp 41 either flashes or goes out (does not light) based on a signal from the 4WD controller 8 that indicates that a problem exists or not with the clutch connection.

A drive mode switch 42 is provided to manually issue a clutch control command that allows the driver to manually select either a four-wheel drive mode or a two-wheel drive mode when the vehicle is below a predetermined vehicle speed.

A 12-volt battery 43 supplies operating electric power to the 4WD controller 8 with a 12-volt relay 44 is installed in the 12-volt electric power supply line thereof in order to connect and disconnect the power to the clutch 12, which is preferably an electromagnetic clutch.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the rotational speed of the respective wheel 1L, 1R, 3L and 3R, respectively. The wheel speed sensors 27RL and 27RR constitute an output shaft rotational speed detector or sensor of the clutch 12.

Figure 3:
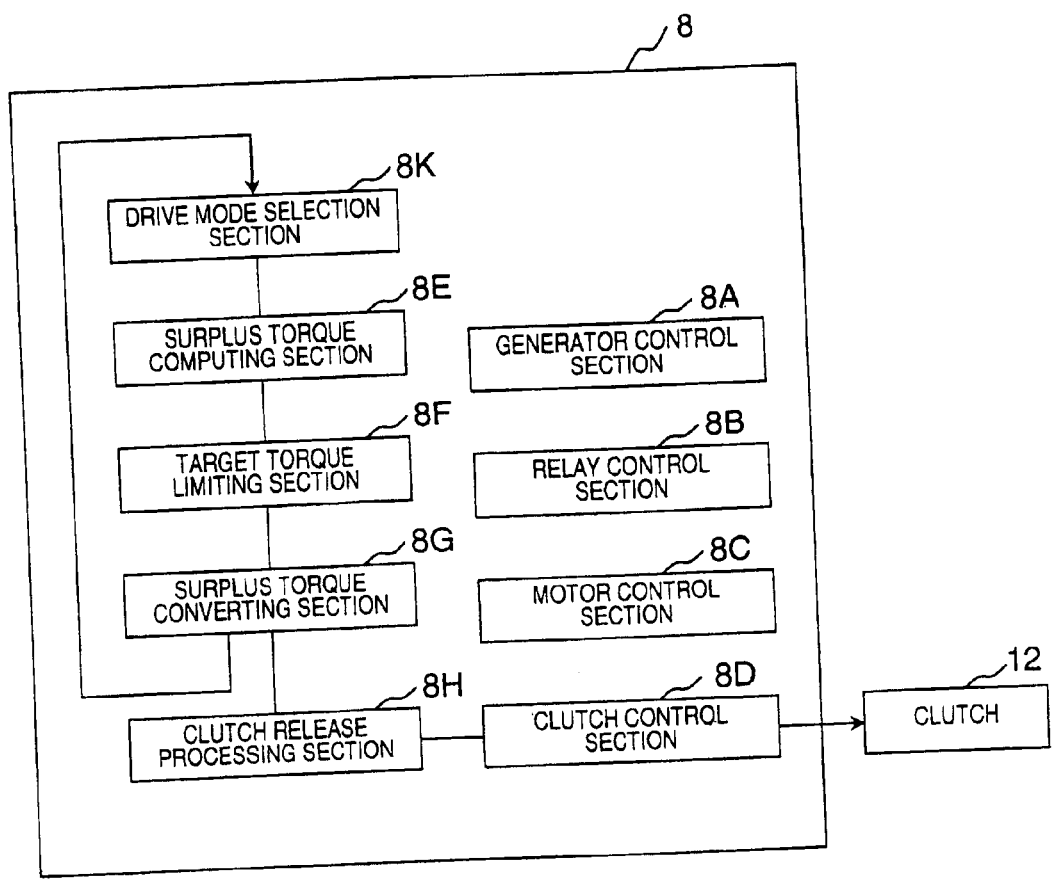
FIG. 3 is a block diagram showing the 4WD controller for the vehicle driving force control apparatus illustrated in FIG. 1 in accordance with the illustrated preferred embodiments of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, a clutch release processing section 8H, and a drive mode selection section 8K. The clutch release processing section 8H constitutes or includes an output shaft stop estimating section, an input shaft stop estimating section, and a clutch connection command outputting section.

The 4WD controller 8 is a control unit that preferably includes a microcomputer with a 4WD control program that is operatively coupled to the internal combustion engine 2 and the electric motor 4 to control the torque applied to the left and right front wheels 1L and 1R by the internal combustion engine 2 and the torque applied to the left and right rear wheels 3L and 3R by an electric motor 4 as discussed below. The 4WD controller 8 can also include other conventional components such as an input interface circuit, an output interface circuit, and storage devices such as a ROM (Read Only Memory) device and a RAM (Random Access Memory) device. The memory circuit stores processing results and control programs. The RAM of the 4WD controller 8 stores statuses of operational flags and various control data for the control program. The ROM of the 4WD controller 8 stores various operations for the control program. The 4WD controller 8 is capable of selectively controlling any of the components of the driving force control apparatus in accordance with the control program. It will be apparent to those skilled in the art from this disclosure that the precise structure and algorithms for 4WD controller 8 can be any combination of hardware and software that will carry out the functions of the present invention. In other words, "means plus function" clauses as utilized in the claims should include any structure including, but not limited to, hardware and/or algorithm or software that can be utilized to carry out the function of the "means plus function" clause. Moreover, the terms "device" and "section" as utilized in the claims should include any structure, i.e., hardware alone, software alone, or combination of hardware and software.

Through the voltage adjuster 22, the generator control section 8A monitors the generated voltage V of the generator 7 and outputs the generator control command value C1 of the generator 7 to adjust the field current Ifh.

The relay control section 8B controls shutting off and connecting the power supply from the generator 7 to the electric motor 4.

The monitor control section 8C adjusts the torque of the electric motor 4 to the required value by adjusting the field current Ifm of the electric motor 4.

The clutch control section 8D controls the state of the clutch 12 by outputting a clutch control command to the clutch 12.

The drive mode selection section 8K includes the drive mode switch 42 that allows the driver to manually select either a four-wheel drive mode or a two-wheel drive mode when the vehicle is below a predetermined vehicle speed.

Figure 4:
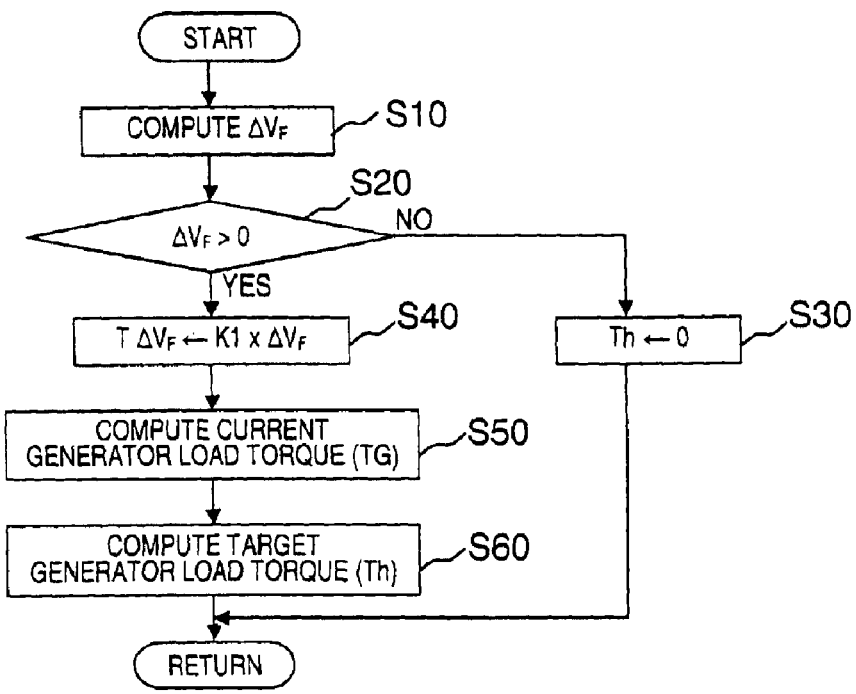
FIG. 4 is a flow chart showing the processing sequence executed by the surplus torque computing section of the 4WD controller for the vehicle driving force control apparatus illustrated in FIG. 1 in accordance with the illustrated embodiments of the present invention.

As shown in FIG. 4, at a prescribed sampling time cycle, the 4WD controller 8 executes the processing of the drive mode selection section 8K, the surplus torque computing section 8E, the target torque limiting section 8F, and the surplus torque converting section 8G in sequence based on the input signals. Together, the drive mode selection section 8K, the surplus torque computing section 8E, the target torque limiting section 8F, and the surplus torque converting section 8G constitute an output torque control section of the 4WD controller 8. In other words, the drive mode selection section 8K, the surplus torque computing section 8E, the target torque limiting section 8F, and the surplus torque converting section 8G can also be referred to as a subordinate drive source control section.

Next, the surplus torque computing section 8E will be discussed which executes the processing shown in FIG. 4.

First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed ΔVF, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two Equations (1) and (2):

$$V_{Wf}=(V_{Wfl}+V_{Wfr})/2 \tag{1}$$

$$V_{Wr}=(V_{Wrl}+V_{Wrr})/2 \tag{2}$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following Equation (3):

$$\Delta V_F=V_{Wf}-V_{Wr} \tag{3}$$

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S30, where a target generator load torque Th is set to zero and the 4WD controller 8 returns to the beginning of the control loop.

Conversely, if in step S20 slippage speed $\Delta V_F$ is determined to be larger than zero, it is estimated that the front wheels 1L and 1R are experiencing acceleration slippage, and thus, control proceeds to step S40. In step S40, the absorption torque $T\Delta V_F$ required for suppressing the acceleration slippage of the front wheels 1L and 1R is calculated using the Equation (4) below and the 4WD controller 8 proceeds to step S50. The absorption torque $T\Delta V_F$ is an amount that is proportional to the acceleration slippage magnitude, as set forth in the following Equation (4):

$$T\Delta V_F=K1\times\Delta V_F \tag{4}$$

where: K1 is a gain that is found through experimentation or the like.

In step S50, a current load torque TG of the generator 7 is calculated based on the Equation (5) below, and then the 4WD controller 8 proceeds to step S60.

$$TG = K2\frac{V \times Ia}{K3 \times Nh} \tag{5}$$

where: V: voltage of the generator 7,

Ia: armature current of the generator 7,

Nh: rotational speed of the generator 7,

K3: efficiency, and

K2: coefficient.

In step S60, the surplus torque, i.e., the target generator load torque Th that the generator 7 should impose, is found based on the Equation (6) stated below, and the 4WD controller 8 returns to the beginning of the control loop.

$$Th = TG + T\Delta V_F \qquad (6)$$

Figure 5:
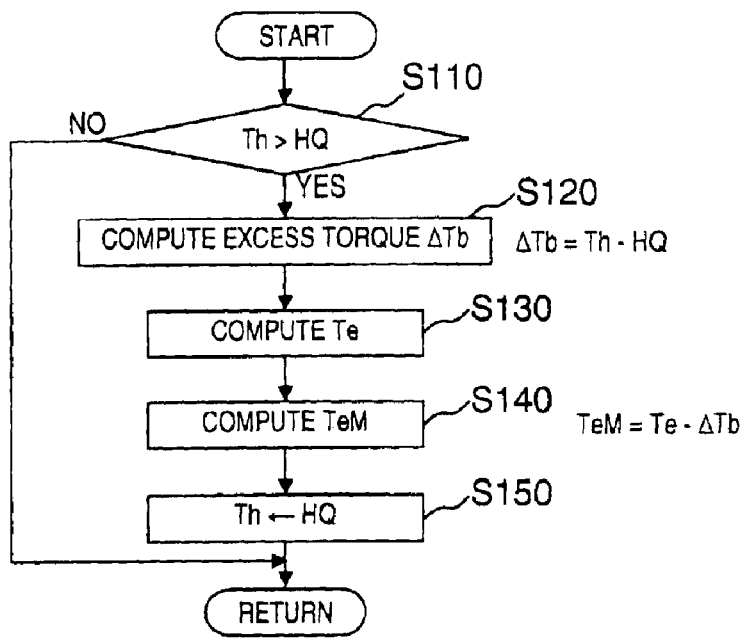
FIG. 5 is a flow chart showing the processing sequence executed by the target torque limiting (control) section of the 4WD controller for the vehicle driving force control apparatus illustrated in FIG. 1 in accordance with the illustrated embodiments of the present invention.

Next, the processing executed by the target torque (control) limiting section 8F will be explained based on FIG. 5. The processing of the target generator load torque Th in the flow chart of FIG. 5 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S110, the target torque limiting section 8F of the 4WD controller 8 determines whether or not the target generator load torque Th is larger than the maximum load capacity HQ of the generator 7. The 4WD controller 8 proceeds to the beginning of the control program to repeat the processing if the 4WD controller 8 determines that target generator load torque Th is less than or equal to the maximum load capacity HQ of the generator 7. Conversely, the 4WD controller 8 proceeds to step S120 if the 4WD controller 8 determines that the target generator load torque Th is larger than the maximum load capacity HQ of the generator 7.

In step S120, the excess torque ΔTb, which is the portion of target generation load torque Th that exceeds the maximum load capacity HQ, is found according to the following Equation (7):

$$\Delta Tb = Th - HQ. \qquad (7)$$

Then, the 4WD controller 8 proceeds to step S130.

In step S130, the current engine torque Te is computed based on the signals from the throttle sensor 19a and the engine rotational speed sensor 21 using an engine torque calculation map. Then, the 4WD controller 8 proceeds to step S140.

In step S140, the engine torque upper limit value TeM is calculated by subtracting the excess torque ΔTb from the engine torque Te, as set forth in the following Equation (8):

$$TeM = Te - \Delta Tb. \qquad (8)$$

After the engine torque upper limit value TeM is outputted to the engine controller 18, the 4WD controller 8 proceeds to step S150.

In step S150, the maximum load capacity HQ is assigned as the target generation load torque Th, and then the 4WD controller 8 returns to the beginning of the control loop.

Figure 6:
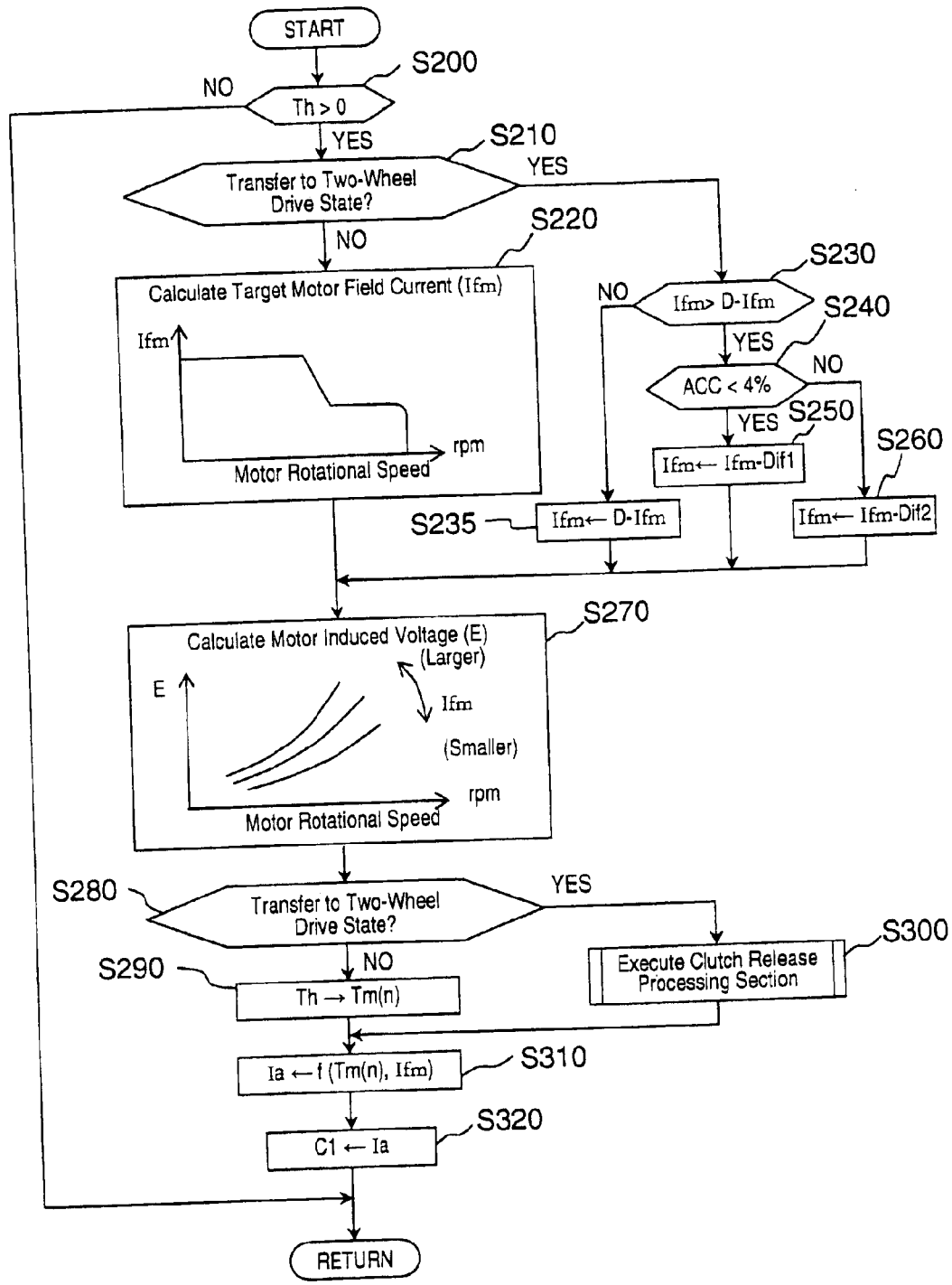
FIG. 6 is a diagram showing the processing executed by the surplus torque converting section in accordance with the first embodiment based on the present invention.

Next, the processing executed by the surplus torque converting section 8G will be explained based on FIG. 6.

First, in step S200, the 4WD controller 8 determines if the target generator load torque Th is larger than 0. If the target generator load torque Th is determined to be larger than 0, then the program of the 4WD controller 8 proceeds to step S210 because the front wheels 1L and 1R are experiencing acceleration slippage. If the 4WD controller 8 determines that the target generator load torque Th is less than or equal to 0, then the 4WD controller 8 returns to the beginning of the control loop because the front wheels 1L and 1R are not experiencing acceleration slippage.

In step S210, the 4WD controller 8 determines whether a transition is being made from a four-wheel drive state to a two-wheel drive state. The 4WD controller 8 proceeds to step S230 if a transition to two wheels is being made and to step S220 for regular processing if no transition to two wheels is being made.

In the present embodiment, the 4WD controller 8 determines that a transition is made to a two-wheel drive state, in which the clutch 12 should be released, if the target motor torque Tm is decreasing and the target motor torque Tm is at or below a prescribed threshold torque T-TM1.

Whether the target motor torque Tm, which is the torque command value for the electric motor 4, is decreasing may also be determined merely by comparing the target motor torque with a preceding value. In other words, it is acceptable to determine if the target motor torque is decreasing by simply comparing the current target motor torque with the target motor torque from the previous processing cycle using Equation (9) below:

$$Tm(n-1) - Tm(n-2) < 0 \qquad (9)$$

In Equation (9), the subscript (n-1) indicates that the target motor torque is from one processing cycle previous and the subscript (n-2) indicates that the target motor torque is from two processing cycles previous. However, in order to suppress the effects of noise or the like, it is also acceptable to determine if the target motor torque is decreasing based on target motor torque values from three or more previous cycles (for example, the Equation (10) shown below uses values from six processing cycles). It is also acceptable to determine that the target motor torque is decreasing when the target motor torque decreases continuously over a plurality of processing cycles using the Equation (10) below:

$$[Tm(n-1) + Tm(n-2) + Tm(n-3)] - [Tm(n-4) + Tm(n-5) + Tm(n-6)] < 0 \qquad (10)$$

In step S220, the rotational speed Nm of the electric motor 4 detected by motor rotational speed sensor 26 is received as input. The target motor field current Ifmt corresponding to the rotational speed Nm of the electric motor 4 is calculated and the target motor field current Ifmt is outputted to the motor control section 8C. Then, the 4WD controller 8 proceeds to step S280.

The target motor field current Ifmt corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm(n) is obtained by reducing the field current Ifm of the electric motor 4 and lowering the required motor induced voltage E. As a result, even if the electric motor 4 rotates at a high speed, the required motor torque Tm(n) can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm(n) by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm(n) can be obtained because the motor induced voltage E of the electric motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

Meanwhile, if the 4WD controller 8 determines that a transition is being made to a clutch-releasing two-wheel drive, then the program proceeds to step S230. In step S230, the 4WD controller 8 determines whether the target motor field current Ifm is greater than a prescribed (end-time) field current limit value D-Ifm, which is a prescribed limiting field current value. If so, the 4WD controller 8 proceeds to step S240. If the field current Ifm is less than or equal to the prescribed field current limit value (D-Ifm), the 4WD controller 8 proceeds to step S235 where it keeps the field current Ifm at the prescribed field current limit value (D-Ifm). The 4WD controller 8 then proceeds to step S270.

Here, the prescribed (end-time) field current limit value D-Ifm is the minimum field current value at which the electric motor 4 is capable of generating very small torque. Setting the limit value to such a small value serves to curb power consumption during two-wheel drive operation. Needless to say, it is acceptable for the prescribed field current limit value (D-Ifm) to be larger than the minimum field current value at which the electric motor 4 is capable of generating very small torque. In other words, it will be apparent to those skilled in the art from this disclosure that the end-time field current value D-Ifm may also be greater than the minimum field current value at which the electric motor 4 can generate a minute torque.

In step S240, the 4WD controller 8 determines if the accelerator position (ACC) or the corresponding throttle opening is less than 4% based on the signal from the accelerator sensor 29 or a corresponding throttle opening sensor. If the accelerator position or the corresponding throttle opening is less than 4%, the 4WD controller 8 proceeds to step S250. Otherwise, the 4WD controller 8 proceeds to step S260.

An accelerator position or the corresponding throttle opening (detected accelerator position opening degree) of less than 4% indicates that the accelerator pedal 17 is not being depressed at all or is not being depressed enough (i.e., the acceleration instruction amount is not large enough) to affect the acceleration of the vehicle. In other words, the phrase "the accelerator position opening degree is less than 4%" refers to an acceleration indicating amount sufficient to exclude the effect of the vehicle on the acceleration irrespective of whether the accelerator pedal 17 is depressed or in a state in which it is not depressed.

In step S250, the 4WD controller 8 reduces the field current by the amount of a first reduction value Dif1 and outputs the new field current Ifm to the motor control section 8C before proceeding to step S270.

Meanwhile, in step S260, the 4WD controller 8 reduces the field current by the amount of a second reduction value Dif2 and outputs the new field current Ifm to the motor control section 8C before proceeding to step S270.

The second reduction value Dif2 is set to a smaller value than the first reduction value Dif1. As a result, the decrease or change rate at which the field current value is reduced toward the prescribed field current limit value (D-Ifm) is larger when the accelerator position is less than 4% so that the prescribed field current limit value (D-Ifm) can be reached sooner.

Although in the preceding explanation, the reduction value by which the field current Ifm is reduced is set to one of two different values based on whether or not the accelerator pedal is depressed in an effectual way (i.e., whether or not there is an effectual acceleration instruction), it is also acceptable to set the reduction value of the field current Ifm to one of three or more different values or to vary the reduction value in a continuous manner in accordance with the acceleration instruction amount.

In addition, determining whether the accelerator position opening degree is less than 4% makes it possible to also estimate the reduction in the generation capacity. Thus, the program proceeds to step S250 if the 4WD controller 8 determines in step S240 on the basis of the rotational speed of the internal combustion engine 2, the rotational speed of the generator 7, or the like that the generation capacity is decreasing or there is a risk of such a decrease, and the program proceeds to step S260 if no such determination is made.

In step S270, the induced voltage E of the electric motor 4 is calculated based on the target motor field current Ifmt and the rotational speed Nm of the electric motor 4. Then, the 4WD controller 8 proceeds to step S280.

In step S280, the 4WD controller 8 determines whether a transition is being made from a four-wheel drive state to a two-wheel drive state. If a transition to a two-wheel drive state is being made, then the 4WD controller 8 proceeds to step S300. If this is not the case, then the 4WD controller 8 proceeds to step S290.

In step S300, the 4WD controller 8 executes the clutch release processing section 8H and then proceeds to step S310.

Determining whether a transition from a four-wheel drive state to a two-wheel drive state is made should be done in the same manner as in step S210 above. It is also possible to set up a flag for indicating whether a transition to a two-wheel drive state is made in step S210, and to perform the determination based on this arrangement.

In step S290, the 4WD controller 8 uses a map or the like to calculate the corresponding target motor torque Tm(n) based on the generator load torque Th computed by the surplus torque computing section 8E and then the program proceeds to step S310.

Meanwhile, the program proceeds to step S310 after the clutch release processing section 8H is executed in step S300.

In step S310, the target armature current Ia is calculated using the current target motor torque Tm(n) and target motor field current Ifm as variables, and the program proceeds to step S320.

In step S310, the 4WD controller 8 uses the target motor torque Tm(n) of the current cycle and the target motor field current Ifmt as variables to calculate the corresponding target armature current Ia and then the program proceeds to step S320.

In step S320, the 4WD controller 8 computes the duty ratio C1, which serves as the generator control command value, based on the target armature current Ia and outputs the same before returning to the beginning of the control loop.

Figure 7:
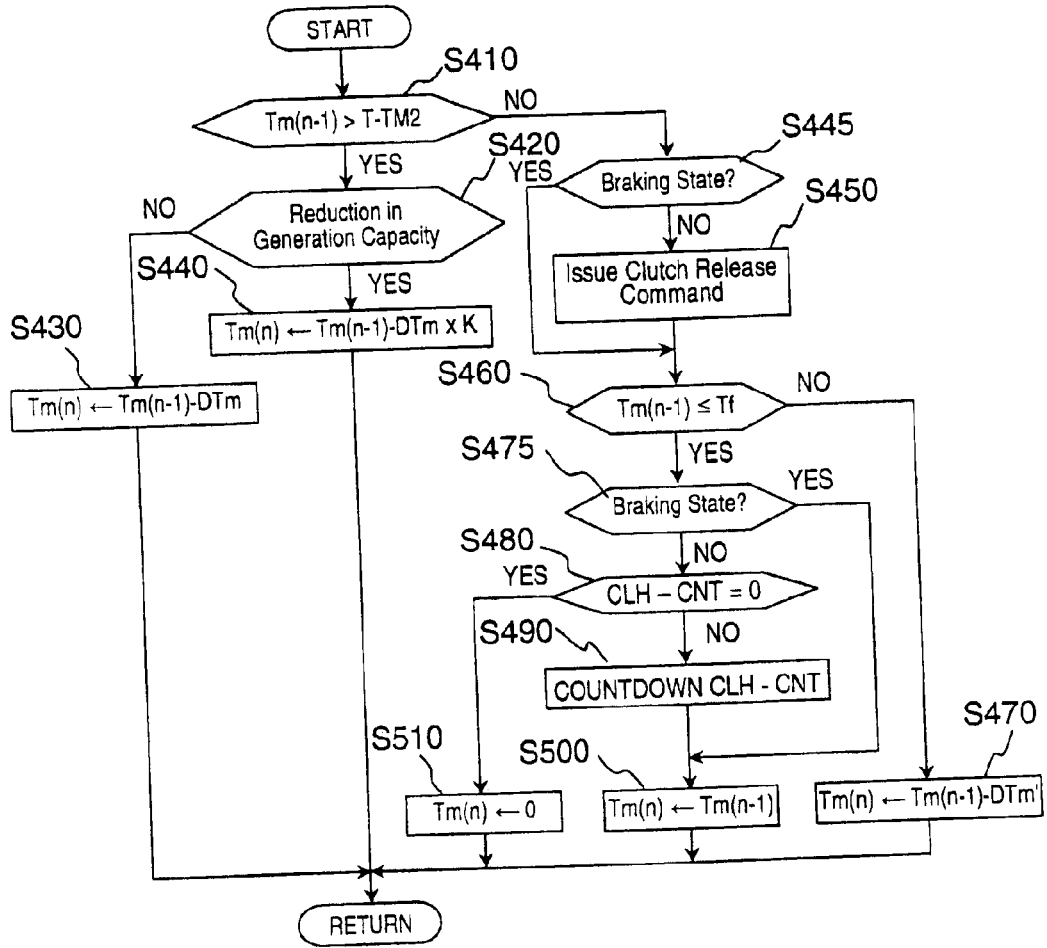
FIG. 7 is a diagram showing the processing executed by the clutch release processing section in accordance with the first embodiment based on the present invention.

The clutch release processing section 8H will now be described with reference to FIG. 7. The clutch release processing section 8H starts up when it is time for the vehicle to shift from the four-wheel drive state to the two-wheel drive state. In step S401, the 4WD controller 8 first determined whether the target motor torque Tm(n-1) is greater than the clutch command output torque T-TM2 at which a clutch release command should be outputted. The 4WD controller 8 proceeds to step S420 if it is determined that the torque is greater than the clutch command output torque T-TM2, and the 4WD controller 8 proceeds to step S445 if it is determined that the torque is equal to or less than the clutch command output torque T-TM2.

Here, the clutch command output torque T-TM2 is a torque value that is greater than the clutch release torque Tf, which is the motor torque at which the clutch 12 is released, but is still in the vicinity of the clutch release torque Tf. The maximum differential between the clutch command output torque T-TM2 and the clutch release torque Tf is determined from the following conditions. Specifically, the value of the clutch command output torque T-TM2 is determined so as to satisfy conditions in which the time from the moment the motor torque becomes the clutch command output torque T-TM2 until the moment the motor torque becomes the clutch release torque Tf is less than the clutch response delay time from the moment the clutch release command is outputted until the moment the clutch 12 is actually released when control is performed such that the motor torque becomes the clutch release torque Tf, as described below.

In addition, the clutch release torque Tf is a value determined by experimentation or calculated by computation or mapping in accordance with the vehicle acceleration, the friction in the torque transfer path on the side of the electric motor, or the like. The clutch release torque Tf is the motor torque value needed to bring the torque on the clutch 12 to zero during vehicle travel. The clutch release torque Tf is estimated to be the sum (Tf=$Tf_1$+$Tf_2$) of "the torque $Tf_1$ for the friction of the electric motor and the reduction gear" and "the torque $Tf_2$ for accelerating the electric motor and the reduction gear equally with the acceleration of the rear wheels."

In the present embodiment, it is assumed that the contribution from "the torque $Tf_1$ for the friction of the electric motor and the reduction gear" is greater than the contribution from "the torque $Tf_2$ for accelerating the electric motor and the reduction gear equally with the acceleration of the rear wheels," and the clutch release torque Tf is set to a fixed value that corresponds to "the torque $Tf_1$ for the friction of the electric motor and the reduction gear," which is determined by experimentation or the like.

In step S420, the 4WD controller 8 determines whether the generation capacity of the generator 7 decreases to a state in which the power generation that corresponds to the target motor torque Tm, which is a target torque command value, cannot be provided or is in danger of not being provided. The 4WD controller 8 proceeds to step S440 if it is determined that there is a decrease in the generation capacity, and to step S430 if this is not the case.

According to the aforementioned determination, a state is established in which the power generation that corresponds to the target torque command value cannot be provided or is in danger of not being provided if, for example, the gear position of the transmission 30 shifts up into second or higher gear on the basis of a signal from the shift position detection device 32.

In step S430, a setting is established such that the motor torque decreases at the normal torque decrease rate DTm on the basis of the Equation (12) shown below, and the program returns to the beginning.

$$Tm(n)=Tm(n\text{-}1)\text{-}DTm \qquad (12)$$

In step S440, the normal torque decrease rate DTm is multiplied by a gain K greater than 1 (for example, 2) to keep the decrease rate low on the basis of the Equation (13) shown below when the torque rapidly decreases, and the 4WD controller 8 returns to the beginning.

$$Tm(n)=Tm(n\text{-}1)\text{-}DTm \times K \qquad (13)$$

Although the decrease rate is multiplied by a gain K greater than 1 to limit the target torque command value, it is also possible to subtract a specific preset decrease rate.

If it is concluded in the determination of step S410 that the target motor torque is equal to or less than the clutch command output torque T-TM2, the 4WD controller 8 proceeds to step S445, in which it is determined whether a braking state exists or not. This braking state determination can be carried out in a variety of ways. Preferably, a braking state, as determined in step S445, exists when a braking force command amount is greater than a prescribed amount, which is preferably greater than zero. The braking force command amount is outputted from the brake stroke sensor 35 or the wheel pressure sensors WP to the 4WD controller 8, which determines if the braking force command amount is greater than a prescribed amount. Of course, the brake stroke sensor 35 or the wheel pressure sensors WP can alternatively be set such that any detected braking force results in a determination that a braking state exists. For example, the brake stroke sensor 35 includes a brake pedal switch, as mentioned above, that is configured and arranged to detect a braking state (e.g., brake is operated or not). As mentioned above, the brake stroke sensor 35 is configured to determine the braking force command amount based on either the actual pedal stoke or based on master cylinder pressure. Thus, the brake stroke sensor 35 or the wheel pressure sensors WP together with step S445 can be considered to be a brake force command determining section.

When it is determined that a braking state exists, the program proceeds to step S460 without outputting the clutch release command. When it is determined that the braking state does not exists (e.g., the brake is not operated), the program proceeds to step S450. This step S445 constitutes a release prohibiting section of the 4WD controller 8. Alternatively, step S445 constitutes a clutch maintaining section of the 4WD controller 8, since step 445 effectively maintains the current state of the clutch 12 when the brake stroke sensor 35 or the wheel pressure sensors WP determines the braking state.

In step S450, the clutch release command is outputted through the clutch control section 8D, and the program proceeds to step S460. Here, the clutch 12 is actually released once the clutch release command has been outputted and the operating delay of the clutch 12 has elapsed. In other words, there is a clutch response delay time that elapses between the time when the clutch release command is issued and the time when the clutch 12 is actually released. This clutch response delay time is ascertained in advance.

In step S460, the 4WD controller 8 determines whether the target motor torque Tm(n-1) is equal to or less than the clutch release torque Tf at which the acceleration on the clutch output side is in substantial equal to the acceleration on the clutch input side the moment the clutch 12 is released, i.e., at which the torque on the clutch 12 is substantially zero. The 4WD controller 8 proceeds to step S475 and the target motor torque Tm(n) is kept at the clutch release torque Tf, if it is determined that the torque is equal to or less than the target motor torque Tm(n). If, on the other hand, the target motor torque Tm(n-1) is greater than the clutch release torque Tf, the current target motor torque Tm(n) is reduced at a decrease rate DTm' in relation to the preceding value on the basis of the Equation (14) shown below, and then the 4WD controller 8 proceeds to the beginning.

$$Tm(n)=Tm(n-1)-DTm' \qquad (14)$$

The current target motor torque Tm(n) is thereby gradually reduced until it reaches the clutch release torque Tf.

In the Equation (14) above, the value of the decrease rate DTm' is preferably established, for example, below the decrease rate DTm so as to suppress the actual variation range of the motor torque.

In step S475, the 4WD controller 8 determines whether the braking state exists based on the detected signal sent from the brake stroke sensor 35 or the wheel pressure sensors WP in the same manner as discussed above with respect to step S445. When it is determined that the braking state exists (e.g., the brakes are operated), the program proceeds to step S500 in which the target motor torque Tm(n) is maintained constant. When it is determined that the brake is not operated, the program proceeds to step S480. Thus, step S475 can be considered to be a brake force command determining section.

In step S480, the 4WD controller 8 determines whether a torque holding time counter CLH-CNT is zero. If it is determined that the torque holding time counter CLH-CNT is zero, then zero is substituted for the target motor torque Tm(n) in step S510 in order to no longer keep the motor torque constant and the program then proceeds to the beginning.

If, on the other hand, the torque holding time counter CLH-CNT is greater than zero, the program proceeds to step S490. In step S490, countdown of the torque holding time counter CLH-CNT is executed, and the program proceeds to step S500.

Here, the torque holding time counter CLH-CNT is reset in the four-wheel drive state. The value that is set as the initial value for the torque holding time counter CLH-CNT is one at which the clutch 12 is reliably released when the variation component of the clutch response delay has been absorbed and the motor torque value brought to a constant level.

In step S500, the preceding value is substituted for the current value in order to keep the target motor torque Tm(n) at the constant clutch release torque Tf, as in the equation shown below, and the program is completed and returned to the beginning.

Thus, when the torque holding time counter CLH-CNT is greater than zero, the preceding value is substituted for the current value in order to keep the target motor torque Tm(n) at the constant clutch release torque Tf, as in the Equation (15) shown below.

$$Tm(n)=Tm(n-1) \qquad (15)$$

In the clutch release processing section 8H, step S410 and step S450 constitute a clutch release section or device. Also, steps S460–S510 of the clutch release processing section 8H constitute a clutch release torque control section or device.

Figure 8:
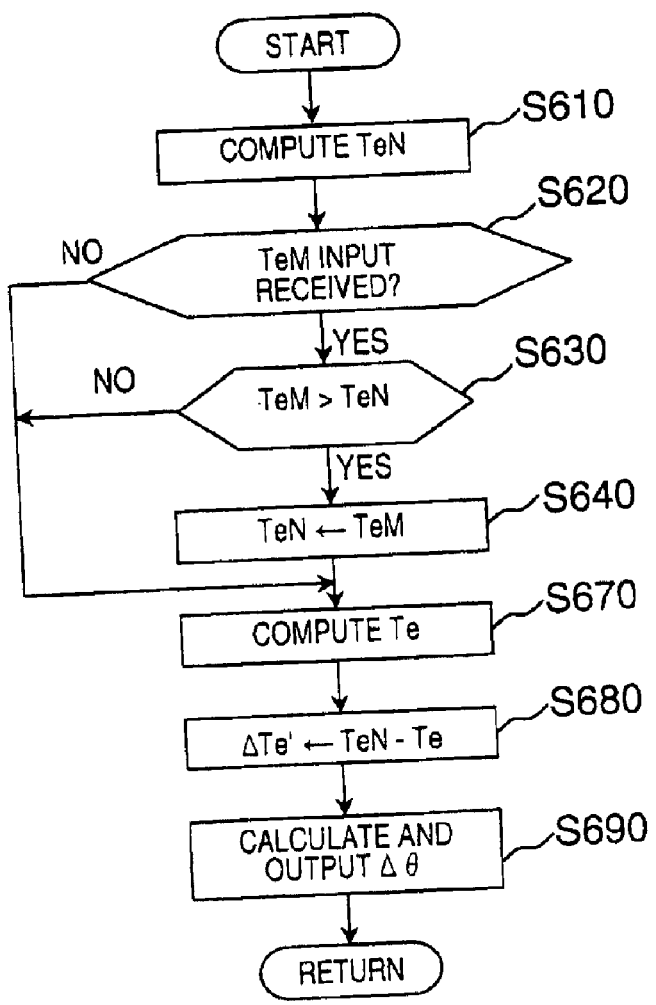
FIG. 8 is a diagram showing the processing executed by the engine controller in accordance with the first embodiment based on the present invention.

Next, the processing executed by the engine controller 18 will be described with reference to FIG. 8. In accordance with a prescribed sampling time cycle, the engine controller 18 executes the processing show in FIG. 8 based on the input signals.

Specifically, in step S610, the engine controller 18 computes the target output torque TeN requested by the driver based on the detection signal from the accelerator sensor 29 and then proceeds to step S620.

In step S620, the engine controller 18 determines if the output torque upper limit TeM has been received from the 4WD controller 8. If it is determined that the output torque limit has been received, the engine controller 18 proceeds to step S630. Otherwise, the engine controller 18 proceeds to step S670.

In step S630, the engine controller 18 determines if the output torque upper limit TeM is larger than the target output torque TeN. If the output torque upper limit TeM is larger, the engine controller 18 proceeds to step S640. Meanwhile, if the output torque upper limit TeM is smaller than or equal to the target output torque TeN, the engine controller 18 proceeds to step S670.

In step S640, the engine controller 18 assigns the value of the output torque upper limit TeM to as the target output torque TeN, thereby increasing the target output torque TeN, and the program then proceeds to step S670.

In step S670, the engine controller 18 calculates the current output torque Te based on the throttle opening degree, the engine rotational speed, etc., and then the program proceeds to step S680.

In step S680, the engine controller 18 calculates the deviation ΔTe' of the target output torque TeN from the current output torque Te using the Equation (16) shown below and then proceeds to step S690.

$$\Delta Te'=TeN-Te \qquad (16)$$

In step S690, the engine controller 18 calculates a change Δθ in the throttle opening degree θ in accordance with the deviation ΔTe' and outputs a throttle opening degree signal corresponding to the throttle opening degree change amount Δθ to the stepper motor 19. Then, the program of the engine controller 18 returns to the beginning of the control loop.

Now the operation of an apparatus constituted as described heretofore will be described. The following explanation assumes the designated drive mode is set to the four-wheel drive mode. The clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R, which are the main drive wheels 1L and 1R, due to the road surface friction coefficient μ being small, or the driver depressing the accelerator pedal 17 too deeply, or the like, the clutch 12 is connected, a transition to a four-wheel drive state is made by having the generator 7 generate at a generator load torque Th corresponding to the magnitude of the acceleration slippage thereof, and a transition to a two-wheel drive state is subsequently made by adjusting the drive torque transferred to the front wheels 1L and 1R so as to approach the road surface reaction force limit torque of the front wheels 1L and 1R. This results in suppression of the acceleration slippage of the front wheels 1L and 1R, which are the main drive wheels.

Furthermore, the acceleration performance of the vehicle is improved by adopting an approach in which the surplus power generated by the generator 7 is used to drive the electric motor 4 as well as the rear wheels 3L and 3R, which are the subordinate drive wheels.

At this time, the energy efficiency is increased and fuel consumption improved because the electric motor 4 is driven by a surplus torque that has exceeded the road surface reaction force limit torque of the main drive wheels 1L, 1R.

Here, if the rear wheels 3L and 3R were always driven, several energy conversions (mechanical energy→electrical energy→mechanical energy) take place, creating energy losses that are proportional to the conversion efficiencies. Therefore, the acceleration performance of the vehicle would decline in comparison with a case where only the front wheels 1L and 1R were driven. Consequently, it is generally desired that driving of the rear wheels 3L and 3R be suppressed. By contrast, this embodiment takes into consideration the fact that when traveling on a slippery road surface or the like, even if all of the output torque Te of the internal combustion engine 2 is transferred to the front wheels 1L and 1R, not all of the torque will be used as driving force. The driving force that cannot be utilized efficiently by the front wheels 1L and 1R is outputted to the rear wheels 3L and 3R, and the acceleration performance is improved.

In addition, the clutch 12 is connected to establish a four-wheel drive state and, with the subsequent suppression of the acceleration slippage, the motor torque is continuously reduced and a transition to a two-wheel drive state made.

Figure 9:
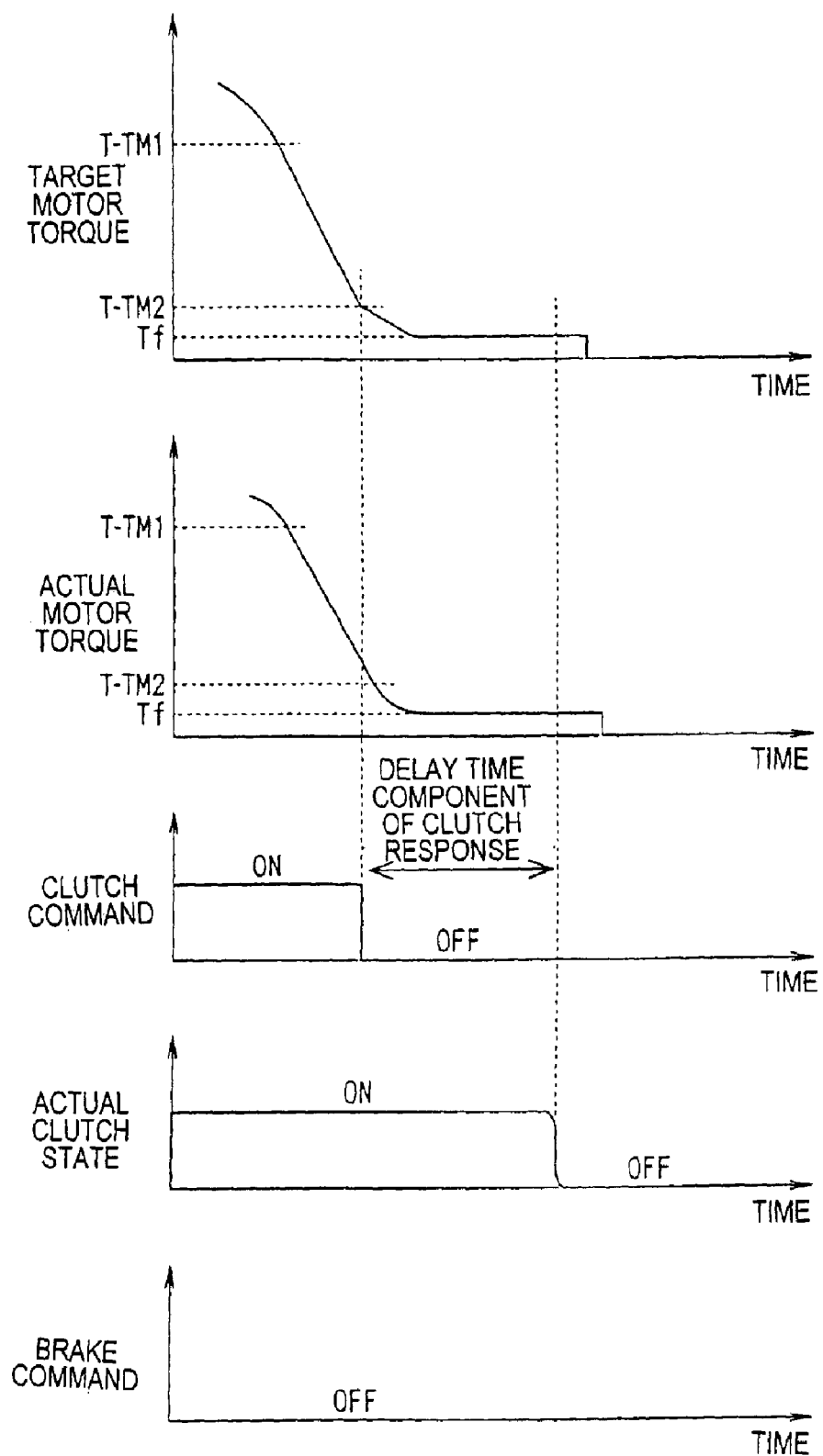
FIG. 9 is a diagram showing exemplary time charts for the clutch release in accordance with the first embodiment based on the present invention.

If at this time the target motor torque Tm(n) is equal to or less than a prescribed threshold T-TM1, the reduction rate, i.e., the decrease rate of the motor torque is kept constant at DTm to allow the torque to decrease at a prescribed gradient during the transition to a two-wheel drive state, and if the target motor torque Tm(n) reaches a clutch command output torque T-TM2 that is slightly greater than the clutch release torque Tf, a clutch release command is outputted and the clutch 12 is released in a state in which the response delay component of the clutch 12 has elapsed and the actual motor torque is kept constant at roughly the clutch release torque Tf, as shown in FIG. 9. Specifically, it is possible to prevent a shock from being generated during clutch release because the clutch 12 is released in a state in which the torque on the clutch 12 is substantially zero during vehicle travel.

In addition, generation of shocks during clutch release can be reliably prevented as a result of the fact that the motor torque value during the actual clutch release can be kept substantially at the clutch release torque Tf, even when the response delay time of the clutch 12 fluctuates somewhat due to temperature and other factors, by adopting an approach in which the actual motor torque values before and after the clutch 12 is actually released are kept at a constant torque substantially equal to the clutch release torque Tf.

When the target motor torque approaches the clutch release torque Tf, the target motor torque is gradually reduced; for example, the decrease rate DTm' of the motor torque is limited to a low value that can be followed in terms of the control performance of the motor drive control, whereby the actual motor torque converges to the desired clutch release torque Tf at an earlier stage without any hunting, thereby making it possible to keep the motor torque during clutch release in a stable manner at substantially the same value as the clutch release torque Tf.

When the generation capacity of the generator 7 has decreased, situations in which the target motor torque and the actual motor torque differ from each other and the motor torque decreases rapidly are prevented by a process in which the target motor torque is controlled to a level at or below the maximum value of the motor torque resulting from the generation deficiency, by increasing the decrease rate at which the torque decreases from the prescribed threshold torque T-TM1 to the clutch command output torque T-TM2.

In the embodiment described above, the clutch release torque Tf is kept constant at "the torque $Tf_1$ for the friction of the electric motor and the reduction gear," which is a value maintained during steady-state travel (at zero acceleration), but this option is non-limiting. It is also possible to perform a correction based on the acceleration (negative acceleration in the case of deceleration) of the rear wheels or the vehicle body. In this case, the clutch command output torque T-TM2 may also be varied in accordance with the correction of the clutch release torque Tf, or may be used as a value that takes into account the variation component based on this correction.

Moreover, when the brake is operated at the time of releasing the clutch 12 and when the vehicle is braked, there is a risk that the electricity generation deficiency or the electricity generation overabundance of the generator that supplies the electricity to the motor 4 may occur. When the electricity generation deficiency or the electricity generation overabundance occurs, the actual motor torque fluctuates greatly, and it becomes difficult to maintain the motor torque during the clutch release to the clutch release torque Tf. Accordingly, there is a risk of generating shocks when the clutch 12 is released. However, in the present embodiment, the clutch is prohibited from being released during braking, and the clutch 12 is released after the braking is over. Therefore, the motor torque during the clutch release is kept at a value substantially equal to the clutch release torque Tf because the disturbance by the braking can be avoided.

In that process, the timing of the clutch release is delayed. However, the period by which the motor torque is maintained constant is set to be longer by the time delayed. Therefore, the motor torque during the clutch release after the braking is over can be set to the clutch release torque Tf. Thus, the shock generation during the clutch release is prevented.

Figure 10:
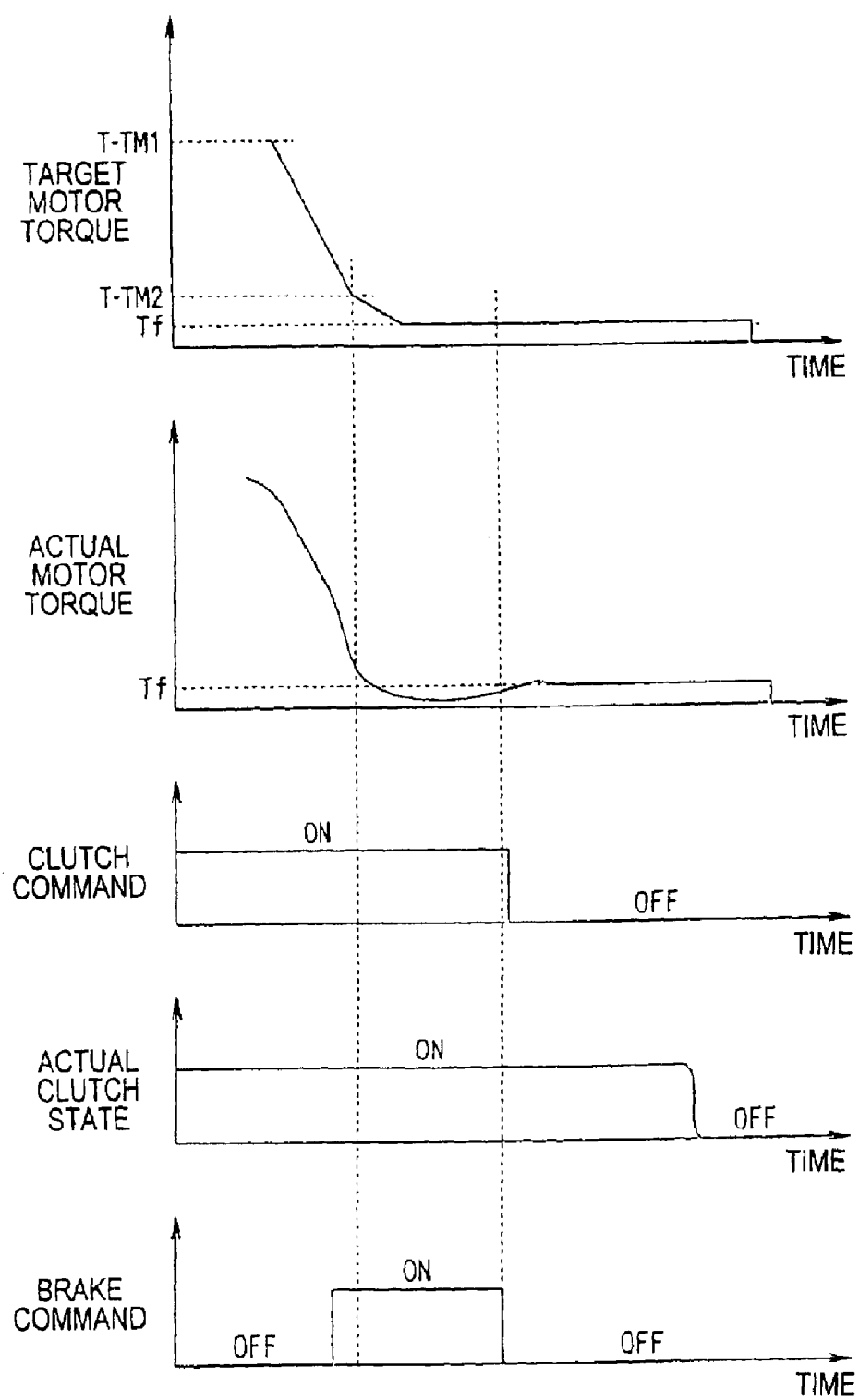
FIG. 10 is a diagram showing exemplary time charts for the clutch release in accordance with the first embodiment based on the present invention.

FIG. 10 shows an example of a time chart in a situation that the brake is depressed when said clutch release condition is met. The time chart shown in FIG. 10 illustrates the situation where the electricity generation deficiency occurs.

Here, the reasons why the electricity generation deficiency or the electricity generation overabundance occurs because of the braking will be explained. When the brake instruction is issued and the engine revolutions decrease more than allowed, the revolutions of the generator also decrease, and thus, the electricity generation deficiency occurs. When the electricity generation deficiency occurs, the motor torque becomes smaller than the target motor torque, and there is a risk that the motor torque cannot be controlled to the target value.

On the other hand, when the engine revolutions decrease and the rate of decreasing of the vehicle speed is larger than the engine revolutions, the electricity generation overabundance occurs. In such a case, there is a risk that the motor torque temporarily becomes larger than the target motor torque, and thus, the motor torque cannot be maintained within the appropriate range of values (the range of values of torque in which the shock does not occur during clutch release).

Here, although whether the clutch release is prohibited or not is determined based on whether the braking exists or not in the above explained embodiment, the present invention is not limited to this type of control. For example, it is also acceptable to prohibit the clutch release when an amount of the brake stroke exceeds a value with which the disturbance against the motor torque by the braking is expected to be more than allowed. Moreover, it is also acceptable to prohibit the clutch release when the engine rotational speed is larger than the vehicle speed by a prescribed value in view of the relationship between the vehicle speed and engine rotational speed. The important thing is to prohibit the clutch release when the disturbance against the brake torque is more than allowed.

Moreover, although, in the above explained embodiment, the four-wheel drive is structured such that the motor 4 is driven by the voltage generated by the generator 7, the present invention is not limited to this type of structure. The present invention can be adapted to a system that is equipped with a battery that supplies the voltage to the motor 4. In such a case, the battery can be configured to supply minute electricity. Moreover, it is also acceptable that the electricity is supplied from the battery as well as from the generator 7.

Furthermore, although the internal combustion engine is used as the main drive source in the above explained embodiment, it is also acceptable to constitute the main drive source with a motor.

Moreover, although the above system is explained in a situation in which the transition to the four-wheel drive state is made in response to the acceleration slippage of the front wheels, the present invention can also be applied to the system in which the transition to the four-wheel drive state is made in response to the accelerator valve opening or the like.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-247552. The entire disclosure of Japanese Patent Application No. 2002-247552 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus for a vehicle having a first drive wheel, a first drive source configured to drive the first drive wheel, and a clutch disposed in a torque transfer path from the first drive source to the first drive wheel, the vehicle driving force control apparatus comprising:
    a drive mode selection section configured to select a first drive mode in which the clutch is engaged and a second drive mode in which the clutch is disengaged;
    a clutch release section configured to output a clutch release command to disengage the clutch when the second drive mode is selected by the drive mode selection section;
    a brake force command determining section configured to determine a braking state; and
    a clutch maintaining section configured to maintain a current state of the clutch when the brake force command determining section determines the braking state.

2. The vehicle driving force control apparatus as recited in claim 1, wherein
    the clutch maintaining section is further configured to prohibit the clutch release section from outputting the clutch release command when the brake force command determining section determines the braking state.

3. The vehicle driving force control apparatus as recited in claim 1, wherein
    the brake force command determining section is further configured to determine the braking state based on a brake pedal switch.

4. The vehicle driving force control apparatus according to claim 1, wherein
    an electric motor forms part of the drive source.

5. The vehicle driving force control apparatus as recited in claim 1, wherein
    the brake force command determining section is further configured to determine a braking force command amount;
    the clutch maintaining section is further configured to prohibit the clutch release section from outputting the clutch release command when the braking force command amount determined by the brake force command determining section is greater than a prescribed amount.

6. The vehicle driving force control apparatus as recited in claim 5, wherein
    the brake force command determining section is further configured to determine the braking force command amount based on wheel cylinder pressure.

7. The vehicle driving force control apparatus as recited in claim 5, wherein
    the brake force command determining section is further configured to determine the braking force command amount based on brake pedal stroke.

8. The vehicle driving force control apparatus as recited in claim 5, wherein
    the brake force command determining section is further configured to determine the braking force command amount based on a brake pedal switch.

9. The vehicle driving force control apparatus as recited in claim 5, wherein
    the brake force command determining section is further configured to determine the braking force command amount based on master cylinder pressure.

10. The vehicle driving force control apparatus as recited in claim 1, wherein
    the clutch release section is further configured to disengage the clutch upon a determination that an output torque of a second drive source substantially equaling a clutch release torque that is required to make a torque on the clutch substantially zero.

11. The vehicle driving force control apparatus as recited in claim 10, further comprising
    a torque control section configured to control the output torque of the second drive source during a release operation of the clutch by the clutch release section such that the output torque of the second drive source is substantially equal to the clutch releasable torque at just prior to release of the clutch.

12. The vehicle driving force control apparatus as recited in claim 11, wherein
the torque control section is further configured to control the output torque of the second drive source to maintain the output torque of the second drive source substantially equal to the clutch releasable torque until the clutch is released during the release operation of the clutch by the clutch release section.

13. The vehicle driving force control apparatus as recited in claim 1, further comprising
an acceleration slippage detection section configured to detect if acceleration slippage is occurring in the first drive wheel that is driven by the first drive source; and
the drive mode selection section being configured to select between the first drive mode and the second drive mode based on detection of acceleration slippage by the acceleration slippage detection section.

14. The vehicle driving force control apparatus as recited in claim 13, wherein
the drive mode selection section includes a drive mode switch to manually select one of the first and second drive modes.

15. The vehicle driving force control apparatus according to claim 13, further comprising
an electric motor forms part of the drive source;
a generator being driven by an internal combustion engine, which is configured and arranged to drive a second drive wheel independent of engagement of the clutch; and
a generator control section configured to control a generation load torque of the generator to substantially correspond to an acceleration slippage magnitude of the first drive wheel, when the acceleration slippage detection section estimates acceleration slippage occurring in the first drive wheel.

16. The vehicle driving force control apparatus according to claim 15, wherein
the electric motor is driven by the generator.

17. A vehicle driving force control apparatus for a vehicle provided with a first drive wheel, a first drive source configured to drive the first drive wheel, and a clutch disposed in a torque transfer path from the first drive source to the first drive wheel, the apparatus comprising:
drive mode selection means for selecting a first drive mode in which the clutch is engaged and a second drive mode in which the clutch is disengaged;
clutch release means for outputting a clutch release command to disengage the clutch when the second drive mode is selected by the drive mode selection means;
brake force command determining means for determining a braking state; and
clutch maintaining means for maintaining a current state of the clutch when the brake force command determining means determines the braking state.

18. A method of controlling driving force of a vehicle provided with a first drive wheel, a first drive source configured to drive the first drive wheel, and a clutch disposed in a torque transfer path from the first drive source to the first drive wheel, the method comprising:
selecting one of a first drive mode in which the clutch is engaged and a second drive mode in which the clutch is disengaged;
outputting a clutch release command to disengage the clutch when the second drive mode is selected;
determining whether a braking state exists; and
maintaining a current state of the clutch when a determination has been made that the braking state exists.

* * * * *